United States Patent [19]

Gerkin et al.

[11] Patent Number: 4,902,768
[45] Date of Patent: Feb. 20, 1990

[54] ELASTOMERS PREPARED FROM N-(POLYOXYALKYL)-N-(ALKYL)AMINES

[75] Inventors: Richard M. Gerkin, Cross Lanes; Nigel Barksby, Dunbar, both of W. Va.

[73] Assignee: Union Carbide Chemicals and Plastics Company Inc., Danbury, Conn.

[21] Appl. No.: 176,221

[22] Filed: Mar. 31, 1988

Related U.S. Application Data

[63] Continuation-in-part of Ser. No. 67,819, Jun. 30, 1987, abandoned.

[51] Int. Cl.⁴ ............... C08G 18/32; C08G 18/10; C08G 18/30
[52] U.S. Cl. ............... 528/68; 528/60; 528/61; 528/76; 528/78; 528/85; 528/44
[58] Field of Search ............ 521/163; 528/76, 60, 528/68, 61, 78, 44, 85

[56] References Cited

U.S. PATENT DOCUMENTS

| | | | |
|---|---|---|---|
| Re. 28,715 | 2/1976 | Stamberger | 521/137 |
| Re. 29,118 | 2/1977 | Stamberger | 521/137 |
| 2,160,058 | 5/1939 | Covert | 564/291 |
| 2,629,740 | 2/1953 | Carnes | 564/487 |
| 2,636,902 | 4/1953 | Taylor | 564/446 |
| 2,888,439 | 5/1959 | Simons | 525/453 |
| 2,888,440 | 5/1959 | Frazer | 525/461 |
| 3,152,998 | 10/1964 | Moss | 502/315 |
| 3,179,606 | 4/1965 | Prescott | 521/159 |
| 3,231,619 | 1/1966 | Speranza | 252/117 |
| 3,236,895 | 2/1966 | Lee | 252/73 |
| 3,256,213 | 6/1966 | Gmitter | 524/726 |
| 3,267,050 | 8/1966 | Kuryla | 521/163 |
| 3,269,999 | 8/1966 | Moore | 106/14.18 |
| 3,309,182 | 3/1967 | Crowley | 44/72 |
| 3,347,926 | 10/1967 | Zech | 544/78 |
| 3,352,916 | 11/1967 | Zech | 252/541 |
| 3,359,243 | 12/1967 | Criner | 524/726 |
| 3,373,204 | 3/1968 | Hales | 564/347 |
| 3,383,417 | 5/1968 | Lichtenwalter | 5/55 R |
| 3,390,184 | 6/1968 | Moss | 564/480 |
| 3,436,359 | 4/1969 | Hubin | 521/163 |
| 3,580,952 | 5/1971 | Moschel | 564/467 |
| 3,625,871 | 12/1971 | Traubel | 264/41 |
| 3,645,969 | 2/1972 | Harvey | 502/167 |
| 3,654,370 | 4/1972 | Yeakey | 544/162 |
| 3,660,319 | 5/1972 | Yeakey | 521/115 |
| 3,666,788 | 5/1972 | Rowton | 564/504 |
| 3,714,128 | 1/1973 | Rowton | 521/163 |
| 3,832,323 | 8/1974 | Ramey | 252/182.26 |
| 3,838,076 | 9/1974 | Moss | 521/163 |
| 3,847,992 | 11/1974 | Moss | 521/164 |
| 4,062,820 | 12/1977 | Mitchell | 260/404.5 |
| 4,075,130 | 2/1978 | Nayler | 252/89.1 |
| 4,115,361 | 9/1978 | Schulze | 525/523 |
| 4,118,422 | 10/1978 | Klein | 544/98 |
| 4,119,615 | 10/1978 | Schulze | 428/474.4 |
| 4,146,700 | 3/1979 | Waddill | 525/504 |
| 4,146,701 | 3/1979 | Waddill | 525/523 |
| 4,152,353 | 5/1979 | Habermann | 564/374 |
| 4,153,581 | 5/1979 | Habermann | 502/331 |
| 4,180,644 | 12/1979 | Marquis | 528/68 |
| 4,184,024 | 1/1980 | Klein | 521/167 |
| 4,191,706 | 3/1980 | Marquis | 528/368 |
| 4,247,301 | 1/1981 | Honnen | 44/63 |
| 4,269,945 | 5/1981 | Vanderhider | 521/159 |
| 4,286,074 | 8/1981 | Davis | 521/137 |
| 4,304,889 | 12/1981 | Waddill | 525/514 |
| 4,332,720 | 6/1982 | Schulze | 521/128 |
| 4,390,645 | 6/1983 | Hoffman | 521/137 |
| 4,396,729 | 8/1983 | Dominguez | 264/45.3 |
| 4,417,075 | 11/1983 | Stogryn | 564/476 |
| 4,431,754 | 2/1984 | Hoffman | 521/137 |
| 4,431,790 | 2/1984 | Umeda | 528/73 |
| 4,433,067 | 2/1984 | Rice | 521/51 |
| 4,444,910 | 4/1984 | Rice | 521/124 |
| 4,448,904 | 6/1984 | Dominguez | 521/160 |
| 4,456,730 | 6/1984 | Balle | 524/839 |
| 4,471,138 | 9/1984 | Stogryn | 564/476 |
| 4,474,900 | 10/1984 | Dominguez | 521/110 |
| 4,474,901 | 10/1984 | Dominguez | 521/163 |
| 4,487,908 | 12/1984 | Dominguez | 528/48 |
| 4,487,912 | 12/1984 | Zimmerman | 528/76 |
| 4,499,038 | 2/1985 | Schafer et al. | 264/51 |
| 4,499,254 | 2/1985 | Dominguez | 528/77 |
| 4,506,039 | 3/1985 | Balle | 521/137 |
| 4,513,133 | 4/1985 | Dominguez | 528/48 |
| 4,526,972 | 7/1985 | Speranza | 546/186 |
| 4,530,941 | 7/1985 | Turner | 521/161 |
| 4,532,266 | 7/1985 | Rasshofer | 521/134 |
| 4,540,720 | 9/1985 | Rasshofer | 521/159 |
| 4,588,840 | 5/1986 | Gurgiolo | 564/443 |
| 4,605,773 | 8/1986 | Maloney | 564/476 |
| 4,642,320 | 2/1987 | Turner | 521/133 |
| 4,686,242 | 8/1987 | Turner | 521/137 |
| 4,705,814 | 11/1987 | Grigsby | 521/159 |
| 4,732,919 | 3/1988 | Grigsby | 521/159 |
| 4,845,133 | 7/1989 | Priester et al. | 521/167 |

FOREIGN PATENT DOCUMENTS

| | | |
|---|---|---|
| 147812 | 3/1985 | European Pat. Off. |
| 3147736 | 6/1983 | Fed. Rep. of Germany . |
| 1466708 | 12/1966 | France . |
| 1567293 | 6/1969 | France . |
| 60-4519 | 2/1985 | Japan . |
| WO86/05795 | 11/1986 | PCT Int'l Appl. |
| 1033912 | 6/1966 | United Kingdom . |
| 1159962 | 7/1969 | United Kingdom . |

OTHER PUBLICATIONS

Amines Via Exchange Reactions, H. Glaser, Houben-Weyl, Methoden der Organischen Chemie, vol. XI/1 (1957), pp. 126–134.

*Primary Examiner*—John Kight
*Assistant Examiner*—Dennis R. Daley
*Attorney, Agent, or Firm*—Paul W. Leuzzi

[57] ABSTRACT

N-(polyoxyalkyl)-N-(alkyl)amines are reacted with isocyanates and chain extenders to form polyureas and/or polyurethane-urea elastomers.

26 Claims, No Drawings

4,902,768

ELASTOMERS PREPARED FROM N-(POLYOXYALKYL)-N-(ALKYL)AMINES

This is a continuation in part of U.S. Ser. No. 07/067,819, filed on June 30, 1987, now abandoned.

BACKGROUND OF THE INVENTION

1. Field of the Invention

The present invention relates to the use of amines and in particular to N (polyoxyalkyl)-N-(alkyl)amines to prepare elastomers and in particular those elastomers prepared via the reaction injection molded (RIM) and cast elastomer processes.

2. Prior Art

Current urethane technology offers potential end users a versatility unsurpassed by any other polymeric system. Using readily available intermediates and processing equipment, it is possible to prepare essentially solid polyurethanes ranging from very soft (40 Shore A) elastomers to very hard (80 Shore D) plastics. These polyurethanes have generally very good physical properties and as result large markets have evolved around their use.

Four major categories of intermediates are used in the preparation of typical urethane elastomer systems. These include: polyols, isocyanates, chain extenders and additives (including catalysts, fillers, internal mold releases and blowing agents).

Several classes of polyols have been used in the preparation of polyurethanes. These include polyesters, polycaprolactones, poly(1,4-butylene) oxides and polyoxyalkylene ethers based on propylene and ethylene oxides.

Amine terminated polyethers have been discussed in the literature for a number of years. These materials have the hydroxyl group of the conventional polyol replaced with a primary amine group using the well known reaction of ammonia with alcohols (polyols) under catalyzed high temperature conditions in the presence of hydrogen. A class of compounds prepared under these conditions is described in U.S. Pat. No. 3,654,370.

Recently, a high molecular weight material of the above class has been made commercially available and introduced into the marketplace. This material has a molecular weight of about 5000 and is prepared by the direct amination of a propylene oxide based triol with ammonia.

Independent of its high reactivity, this material has been used as the soft segment portion of several different high performance reaction injection molding (RIM) polyurea elastomers. While still very new in the RIM industry, these urea systems show considerable promise as candidates for high temperature resistant body panel applications in the automotive industry (i.e., paint oven temperatures of 195°–205° C.).

The major limitation that has restricted further growth of this type of material has been its very high reactivity. This high reactivity limits the shot size and thus part size using current RIM equipment. The problems with existing polyurea systems have been highlighted and a more processable polyurea RIM system is now required to further penetrate the potentially large automotive market.

U.S. Pat. No. 4,396,729 is the first patent indicating that it is possible to use a system comprising of an amine terminated polyether, an amine terminated chain extender, an aromatic isocyanate and an internal mold release in RIM. The patent primarily describes a RIM elastomer which will release from the mold without any external mold release, the system described uses an internal mold release.

U.S. Pat. No. 4,443,067 is the key patent describing an elastomer containing a major amount of polyurea linkages. The elastomer is prepared from an amine terminated polyether, an amine terminated chain extender and an aromatic isocyanate.

U.S. Pat. No. 4,444,910 is a modification of U.S. Pat. No. 4,443,067. It describes the addition of an organometallic catalyst to the RIM system. The addition of the catalyst helps the "green strength" of the elastomer although heat related properties were degraded.

U.S. Pat. No. 4,448,904 describes the use of high 2,4 isomer containing methylene bis(phenylisocyanate). Conventional RIM systems based on polyol require the use of high 4,4 isomer of MDI. The use of a polyether with greater than 50% amine end groups enables MDI containing greater than 10% of the 2,4 isomer to be used.

U.S. Pat. No. 4,474,900 describes the addition of an epoxy modified filler to an elastomer as described in U.S. Pat. Nos. 4,396,729, 4,444,910 and 4,443,067.

U.S. Pat. No. 4,474,901 describes the addition of low molecular weight (less than 1000) amine terminated polyethers to elastomers derived from polyethers of greater than 2500 molecular weight containing greater than 50% amine end groups, an amine terminated chain extender and an aromatic isocyanate.

U.S. Pat. No. 4,487,908 describes the addition of anhydrides to elastomers derived from polyethers of greater than 2500 molecular weight containing greater than 50% amine end groups, an amine terminated chain extender and an aromatic isocyanate.

U.S. Pat. No. 4,487,912 describes the addition of acid amides to elastomers derived from high molecular weight active hydrogen containing material, a chain extender and an aromatic isocyanate.

U.S. Pat. No. 4,499,254 describes the addition of a carboxylic acid of carbon number 10 or more to elastomers derived from polyethers of greater than 2500 molecular weight containing greater than 50% amine end groups, an amine terminated chain extender and an aromatic isocyanate.

U.S. Pat. No. 4,513,133 describes the addition of a low molecular weight organic acid to elastomers derived from polyethers of greater than 2500 molecular weight containing greater than 50% amine end groups, an amine terminated chain extender and an aromatic isocyanate.

U.S. Pat. No. 4,686,242 discloses elastomers made from an amine terminated polyether which is the reaction product of a polyether polyol and methyl amine. The patent further teaches that this approach actually produces an amine terminated polyether where the amine groups are predominantly primary amines.

OBJECT OF THE INVENTION

It is an object of the present invention to provide an elastomer employing a novel class of amines which can be employed in reaction with isocyanates to form polyureas and polyurethane-ureas.

It is another object of the present invention to provide amines with a reactivity with isocyanates which is slow enough to allow for a well controlled reaction yet is sufficiently fast enough to be commercially acceptable.

It is another object of the present invention to provide elastomers prepared via the reaction injection molding (RIM) process.

It is a another object of the present invention to provide elastomers prepared via the cast elastomer process.

Other objects of the invention will be made apparent from the description and examples which follow.

SUMMARY OF THE INVENTION

The present invention provides elastomers which employ a novel class of amines especially designed for reaction with isocyanates to form polyureas and polyurethane-ureas. These amines are N-(polyoxyalkyl)-N-(alkyl)amines generally formed by reacting an alcohol with a primary amine and/or secondary amine in the presence of an appropriate catalyst, such as a nickel catalyst.

Detailed Description of the Invention

In accordance with the present invention there is provided N-(polyoxyalkyl)-N-(alkyl)amines prepared by direct, catalytic amination of an appropriate polyol with an amine of the general formula:

$$R\,[H]_{(hz)}[(P)_p(S)_s(T)_t]_{z-(hz)}$$

wherein R is an initiator radical based on a compound containing Zerewitinoff active hydrogen atoms. Such compounds are capable of initiating polymerization with alkylene oxides when used with a suitable catalyst (e.g., potassium hydroxide, zinc hexacyanocobaltate).

Examples of such compounds include but are not limited to: difunctional compounds such as ethylene glycol, propylene glycol, water, 1,4-butanediol, diethylene glycol; trifunctional compounds such as trimethylolpropane, glycerine; and other polyfunctional compounds such as pentaerythritol, sorbitol, ammonia, ethylene diamine, 1,3-diaminopropane, 1,6-hexanediamine, isomers of phenylenediamine and toluenediamine, 4,4'-diphenylmethane diamine and its isomers, diethanolamine, ethanolamine, dimethylethanolamine, N-methylethanolamine, triethanolamine, triisopropanolamine, ethylmercaptan, thiophenol and propylene disulfide.

Additional examples of compounds suitable for initiating polymerization of alkylene oxides are the various oligomeric polyols known in the art. These include the poly-(1,4 butylene oxide)polyethers and the hydroxyl and amine terminated poly-(butadienes). When polyols (or other oligomers) are used for initiating polymerization of the alkylene oxides, their molecular weights can range from 400 to about 3000. When the conventional initiators such as described above (i.e., glycerine, water, etc.) are used, their molecular weight can range from about 18 (for water) up to about 400. Preferably R contains from two to six carbon atoms and most preferably three to six carbon atoms.

The alkylene oxides and monomers that find utility in the present invention are those well known in the art. These include propylene oxide, ethylene oxide, the alpha olefin oxides such as 1,2-epoxybutane and 1,2-epoxyoctadecane, oxetane, and tetrahydrofuran.

"H" denotes the group represented by the formula:

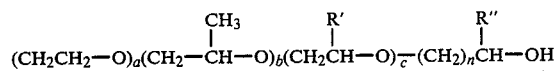

"P" denotes the group represented by the formula:

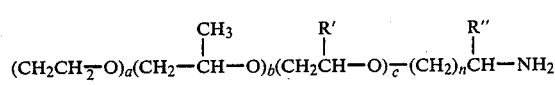

"S" denotes the group represented by the formula:

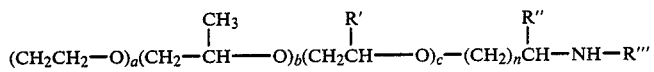

"T" denotes the group represented by the formula:

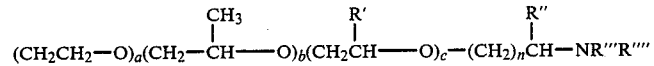

wherein:
the letter "a" defines the ethylene oxide content of the N-(polyoxyalkyl)-N-(alkyl)amine and can range from a value of zero to 175. The preferred range for "a" is 0 to 90. When b or c is not equal to zero, the most preferred range for "a" is 0 to 50.

The letter "b" defines the propylene oxide content of the N-(polyoxyalkyl)-N-(alkyl)amine and can also range from a value of zero to 175. Preferably, "b" should range from 20 to 115 and most preferably from 25 to 98.

The letter "c" defines the alpha olefin oxide.

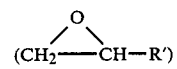

content of the N-(polyoxyalkyl)-N-(alkyl)amine and can range from 0 to 30. Preferably, "c" can range from zero to 15 and most preferably, from 0 to 2.

The letter "n" equals from 1 to 3, most preferably 1.

Two aspects of a, b and c are important and must be noted. The first is that the sum of a+b+c must always be greater than or equal to 2 when n equals 1. Second, a, b and o indicate ethylene oxide, propylene oxide and alpha olefin oxide which can be incorporated into the product backbone in any sequence, i.e., blocks or random sequence, in any configuration.

The letter n is 1 to 3, most preferably 1.

R' is an alkyl group containing from two carbon atoms to eighteen carbon atoms depending on the alpha olefin oxide used in preparation of the amine. While R' can contain up to eighteen carbon atoms, two carbon atoms are most preferred.

R" is hydrogen or an alkyl group containing up to eighteen carbon atoms. It is preferred that R" is hydrogen or alkyl group containing up to two carbons, and most preferably a methyl group.

R''' and R'''' are independently an alkyl group containing from two to twelve carbon atoms, preferably containing from two to six carbon atoms, and most preferably an isopropyl group.

The letter "h" indicates the relative hydroxyl content remaining after amination and has been found to range from 0 to 0.7 with 0 to 0.3 preferred and 0 to 0.15 most preferred. As noted, "h" is related to the percent amination, i.e. 30 percent amination would result in a hydroxyl content of 70 percent and thus "h" would equal 0.7. Values are obtained by taking the total amine number as measured in milliequivalents per gram, and dividing by the initial hydroxyl number (meq/g) and subtracting that quotient from 1.0.

The letter "p" indicates the relative primary amine content to total amine content formed during amination. The letter p ranges from 0–0.5, preferably 0–0.35, and most preferably 0–0.2 for N-(polyoxyalkyl)-N-(alkyl)amine used in the RIM process. The letter "p" ranges from 0–0.4, preferably 0–0.25 for N-(polyoxyalkyl) N-(alkyl)amine used in the cast elastomer process.

The letter "s" indicates the relative secondary amine content to total amine content formed during amination. The letter "s" ranges from 0.5–1, preferably 0.7–1, and most preferably 0.8–1 for N-(polyoxyalkyl)-N-(alkyl)amine used in the RIM process. The letter "s" ranges from 0.5–1, preferably 0.7–1 for N-(polyoxyalkyl)-N-(alkyl)amine used in the cast elastomer process.

The letter "t" indicates the relative tertiary amine content to total amine content formed during amination and is from 0 to 0.15, preferably from 0 to 0.05. The sum of p, s and t must equal 1.0.

The letter "z" is an integer derived from the number of Zerewitinoff active hydrogens on the initiator. The letter "z" ranges from 3 to 6, preferably 3 to 4 for N-(polyoxyalkyl)-N-(alkyl)amine used in the RIM process. The letter "z" ranges from 2 to 6, preferably 2 to 4, and most preferably 2 to 3 for N-(polyoxyalkyl)-N-(alkyl)amine used in the cast elastomer process.

The N-(polyoxyalkyl)-N-(alkyl)amines of the present invention are prepared by direct, catalytic amination of an appropriate polyol with an amine:

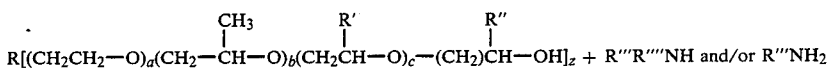

Representative amines useful in the amination are primary amines and secondary amines. Representative primary amine examples include but are not limited to: ethylamine, n-propylamine, isopropylamine, cyclohexylamine, laurylamine, t-butylamine and s-butylamine. Representative secondary amine examples include but are not limited to: diethylamine, di-n-propylamine, diisopropylamine, di n butylamine, diisobutylamine, di-2-ethylhexylamine, di-sec-butylamine, dioctylamine, n-ethyl-n-butylamine and diphenylamine. Use of these secondary amines tends to produce N-(polyoxyalkyl)-N-(alkyl)amines with higher than expected secondary amine content and surprisingly low teritary amine content as described in copending patent application D 15856 filed concurrently.

Another method for preparing secondary amine containing polyethers is described in U.S. Pat. No. 4,286,074, where a primary amine terminated polyether is allowed to react with acetone, with the resulting ketimine being hydrogenated to the product. Although this method is only exemplified for about 1000 equivalent weight materials, it is technically applicable to other molecular weights and functionalities. However, this method is limited by the availability of the primary amine terminated polyether.

Also, the reaction of a primary amine with an alcohol is a known approach. However, U.S. Pat. No. 4,686,242 teaches that this approach actually produces an amine terminated polyether where the amine groups are predominantly primary amines.

The alcohols, and especially the monols and polyols used in the present invention, are well known in the art and commercially available from a variety of sources.

It is also anticipated that blends of primary and secondary amines can be used in the amination process.

The reaction is carried out in a batch autoclave at elevated temperature, generally between 175° C. to 250° C. and preferably 190° C. to 240° C. The reaction pressure will range from 250 to 2000 psi, preferably 500 to 1250 psi. The reaction is run in the presence of hydrogen. Under these conditions the hydroxyl-containing polymer remains in the liquid phase. The stoichiometry on a amine to hydroxyl equivalent basis will range from 2:1 to 20:1, preferably 5:1 to 10:1. The reaction will generally occur in 4 to 24 hours. The catalyst is a nickel, copper or cobalt based catalyst, most preferably nickel, either unsupported or on a support. The catalyst loading is generally on the order of 1 to 5 weight percent based on total charge.

In addition to the batch process described above, the amination can be carried out using a liquid phase continuous amination process. In this process, a pelletized or extruded form of the nickel, copper or cobalt catalyst optionally on a support, is charged to a high pressure tubular reactor. The most preferred catalyst is nickel. The reactor is heated to 175° C. to 250° C., preferably 190° C. to 240° C. and a mixture of amine and polyol (2:1 to 20:1, preferably 5:1 to 10:1 on an equivalents basis) is pumped through the reactor at a flow rate ranging from about 0.5 to 5.0 g feed/g catalyst/hr. Hydrogen is added to the feed stream at a minimum rate of 1 standard cc/min. Reactor pressure is controlled by a back pressure regulator to 250 to 2000 psi, preferably 500 to 1200 psi. The products isolated from the continuous process are similar to those isolated from the batch process.

Elastomers may be prepared from the N-(polyoxyalky)-N-(alkyl)amines by reaction with a chain extender and a polyisocyanate in accordance with techniques well known in the art associated with the RIM process or elastomers may be prepared by first reacting the N-(polyoxyalky)-N-(alkyl)amines with a polyisocyanate together with a chain extender or in a subsequent step with a chain extender in accordance with techniques well known in the art associated with the cast elastomer processes.

Although the N-(polyoxyalkyl)-N-(alkyl)amines of this invention may be used as the sole reactant with the other ingredients, they may also be used in blends with other polymers containing Zerewitinoff active hydrogen atoms known in the art. Thus, the N-(polyoxyalkyl)-N-(alkyl)amines of the invention can be blended with conventional polyether polyols (such as described in U.S. Pat. No. 3,346,557), polymer polyols (such as described in U.S. Pat Nos. Re. 28,715 and 29,118 3,652,639, 3,823,201, 3,850,861, 4,454,255, 4,458,038, 4,550,194, 4,390,645 and 4,431,754), with polymer dispersions in amine terminated polyethers as described in U.S. Pat. No. 4,286,074, poly-(1,4-butylene oxide) polyethers and hydroxyl and amine terminated poly-(butadienes). Limitations on the relative amounts of N-(polyoxyalkyl)-(N)-(alkyl)amines and other materials used in the blends are apparent to one skilled in the art.

Useful chain extenders include low molecular weight (i.e., less than about 400) polyfunctional compounds capable of reaction with an isocyanate. Typical examples include, water, amino alcohols; such as methyldiethanolamine, ethanolamine, diethanolamine and glycols; such as 1,4-butanediol and ethylene glycol; aliphatic diamines such as butylene diamine, 2,5-dimethylpiperazine and others mentioned in U.S. Pat. Nos. 4,246,363 and 4,269,945; and aromatic diamines such as: 1-methyl-3,5-diethyl-2,4-diaminobenzene, 1-methyl-3,5 diethyl 2-6-diaminobenzene (both of these materials are also called diethyltoluene diamine or DETDA), tert-butyltoluene diamine 1,3,5-triethyl-2,6 diaminobenzene, 3,5,3',5'-tetraethyl-4,4'-diaminodiphenylmethane, 3,3'-dichloro-4,4'-diamino diphenylmethane, 2,5-dichlorophenylene-1,4-diamine, amino-ethyl alcohol, 3-aminochlorohexanol, p-amino-phenyl-ethyl alcohol, and others mentioned in GB No. 2138434A and U.S. Pat. No. 3,746,665.

Particularly preferred aromatic diamine chain extenders in the RIM process are 1-methyl-3,5-diethyl-2,4-diaminobenzene or a mixture of this compound with 1-methyl-3,5-diethyl-2,6-diaminobenzene.

The organic polyisocyanates that are useful in producing polyurea or polyurethane-urea elastomers in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6-diisocyanatotoluene (TDI), methylene bis(4-cyclohexyl isocyanate), isophorone diisocyanate, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocynatononane, 1,10-diisocyanatodecane, 1,4-diisocyantocylohexane and isomers thereof, 1,10-diisocyanatopropyl)ether of 1,4-butylene glycol, 1,11-diisocyanatoundecane, 1,12-diisocyanatododecane bis(isocyanatohexyl) sulfide, 1,4-diisocyanatobenzene, 3,5-diisocyanato-o-xylene, 4,6-diisocyanato-m-xylene, 2,6-diisocyanato-p-xylene, tetramethylxylylene diisocyanate, 2,4-diisocyanato-1-chlorobenzene, 2,4-diisocyanato-1-nitrobenzene, 2,5-diisocyanato-1-nitrobenzene, 2,4' and 4,4'-diphenylmethane -diisocyanate (MDI), and -derivatives thereof bis-(4-isocyanatocyclohexyl)methane, 3,3-diphenyl-methylene -diisocyanate, and polymethylene poly (phenyleneisocyanates) as described in the literature and in many patents, for example, U.S. Pat. Nos. 2,683,730; 2,950,263; 3,012,008; 3,344,162; and 3,362,979, and mixtures thereof.

Additional aromatic polyisocyanates include p-phenylene -diisocyanate, polymethylene polyphenylisocyanate, -dianisidine -diisocyanate, bitolylene -diisocyanate, naphthalene 1,4-diisocyanate, bis(3-methyl-3-isocyanatophenyl)methane, bis(3-methyl-4-isocyanatophenyl)methane, and 4,4'-diphenylpropane -diisocyanate.

In particular, the most preferred aromatic polyisocyanate for use in polyurea elastomers made by the RIM process is MDI (4,4' -diphenyl-methane diisocyanate) or its derivatives. Such derivatives include liquid forms as described in U.S. Pat. No. 3,394,164 and so called modified forms as described in U.S. Pat. No. 3,152,162. The liquid forms of MDI are preferred because pure MDI is a solid and can be difficult to use. The most preferred aromatic polyisocyanates for use in polyurea/polyurethane/urea elastomers made by the cast elastomer process is TDI when the prepolymer is to be cured with a diamine, and MDI when the prepolymer is to be cured with a glycol. If light stable (i.e., no yellowing) elastomers are desired, aliphatic isocyanates such as isophorone diisocyanate, tetramethylxylylene diisocyanate and bis-(4-isocyanatocyclohexyl)methane are preferred.

Of course, the term polyisocyanate also includes quasi-prepolymers of polyisocyanates with active hydrogen containing materials.

Preferably the amount of isocyanates used is the stoichiometric amount based on all the ingredients in the formulation or greater than the stoichiometric amount, where the stoichiometric amount of isocyanate is equal to the sum of the number of equivalents of chain-extender and N-(polyoxyalkyl)-N-(alkyl)amine.

As mentioned above, additional catalysts are not necessary for the practice of this invention. In a preferred embodiment no added catalysts are employed.

Other conventional formulation ingredients may be employed as needed such as, for example, stabilizers or nucleating agents. Suitable stabilizers or surfactants are known and may vary depending upon the particular application. Suitable stabilizers include "hydrolyzable" polysiloxane-polyoxyalkylene block copolymers such as the block copolymers described in U.S. Pat. Nos. 2,834,748 and 2,917,480. Another useful class of stabilizers are the "non-hydrolyzable" polysiloxane-polyoxyalkylene block copolymers such as the block copolymers described in U.S. Pat. Nos. 3,505,377 and 3,686,254. The latter class of copolymers differs from the above mentioned polysiloxane-polyoxylakylene block copolymers in that the polysiloxane moiety is bonded to the polyoxy-alkylene moiety through direct carbon-to-silicon bonds, rather than direct carbon-to-oxygen to-silicon bonds. These various polysiloxane-polyoxyalkylene block copolymers preferably contain from 5 to 50 weight percent of polysiloxane polymer. Yet another useful class of stabilizer is composed of the cyanoalkyl-polysiloxanes described in U.S. Pat. No. 3,905,924. Siloxanes described in U.S. Pat. No. 3,194,733 are also useful.

Other additivies which may be used are those products which fit into the broad class of internal mold releases (IMR's) such as polysiloxane polymers having pendant organic groups which contain a hydroxyl, hydroxyalkylamino, amino or mercapto group and the like exemplified in U.S. Pat. Nos. 4,396,729 4,472,341, U.S. Pat. No. 4,477,366, and U.S. Pat. No. 4,546,154; or surface active organic compounds such as fatty acid amides, hydroxylated lecithins, fluorinated alkyl phosphates and carboxylates and the corresponding salts and the like exemplified in U.S. Pat. Nos. 4,374,222, 4,451,425, 4,485,829; or metal salts such as zinc stearate as exemplified in European Patent Application No. 0,119,471.

Reinforcing materials, if desired, known to those skilled in the art may also be employed. For example, chopped or milled glass fibers, milled glass flakes, chopped or milled carbon fibers and/or other mineral fibers are useful.

Post curing of the elastomer of the invention is optional. Post curing will improve some properties such as heat sag. Employment of post curing depends on the desired properties of the end product.

Whereas the exact scope of the instant invention is set forth in the appended claims, the following specific examples illustrate certain aspects of the present invention and, more particularly, point out methods of evaluating the same. However, the examples are set forth for illustration only and not to be construed as limitations on the present invention except as set forth in the appended claims. All parts and percentages are by weight unless otherwise specified.

EXAMPLES

Definitions

Polyol #1 = A polyoxyalkylene oxide triol produced from propylene oxide and glycerine. The product has a hydroxyl number of 34.

Polyol #2 = A polyoxyalkylene oxide triol produced from propylene oxide and glycerine polymerized at 105° C. The final product has an hydroxyl number of 28 mgKOH/g.

Polyol #3 = A polytetramethyleneglycol diol of about 2000 molecular weight.

Polyol #4 = A polyoxyalkylene oxide diol produced from ethylene oxide with a molecular weight of about 400.

Catalyst #1 = A nickel catalyst sold commercially by Harshaw/Filtrol Parternship as "Nickel 5136P".

Catalyst #2 = A nickel catalyst sold commercially by Harshaw/Filtrol Partnership as Ni-3288 a one sixteenth inch extrudate.

DETDA = Diethyltoluene diamine, an aromatic amine chain extender sold commercially by Lonza.

T-5000 = A primary amine capped polyether of about 5000 molecular weight sold commercially by Texaco Inc. as JEFFAMINE ™ T-5000.

ISONATE ™ Code 205 = A 17.5% free NCO soft block prepolymer based on MDI and sold by Dow Chemical.

t-BTDA = Tertiary butyl toluenediamine (80% 2,4 isomer and 20% 2,6 isomer), an experimental chain extender made by Air Products, material is designated XCE-89.

EXAMPLE 1

Preparation of ca. 5000 MW N-(polyoxyalkyl)-N-alkyl)amine, no catalyst activation. Polyol #1 (999.1 g), isopropylamine (318.9 g) and Catalyst #1 (25 g) were charged to an autoclave (1 Gallon). This system was pressurized and vented 5 times with hydrogen, and then pressurized to 500 psig. The reactor was heated to 240° C. for 12 hrs. After cooling, the catalyst was filtered and excess amine was removed by vacuum stripping. The isolated amine terminated polyol had an amine number of 0.515 meg/g, a conversion of 93% and contained 5.0% coupling product. Secondary amine content of this product was not measured but a subsequent batch made under identical conditions was analyzed and found to have 50% primary amine content, 50% secondary amine content and the tertiary amine level was 0.037 meg/g.

EXAMPLE 2

The N-(polyoxyalkyl)-N-(alkyl)-amine prepared in Example 1 was again prepared by that procedure a number of times and the product blended together. The amine terminated polyol blend had an amine number of 0.554 meg/g and a conversion of 97.0%.

EXAMPLE 3

Preparation of 5000 MW N-(polyoxyalkyl) -N-(alkyl)amine, no catalyst activation. Polyol #1 (2000 g) isopropylamine (634.4 g) and Catalyst #1 (50 g) were charged to an autoclave (1 Gallon). This system was pressurized and vented 5 times with hydrogen and then pressurized to 500 psig. The reactor was heated to 240° C. for 8 hr. After isolation as in Example #1, the amine terminated polyol had an amine number of 0.535 meg/g and a conversion of 97%.

EXAMPLE 4

Preparation of 6000MW N-(polyoxyalkyl)-N-(alkyl) amine with high secondary amine content via the continuous process. Catalyst #2, 284.5 g was charged to a vertical six foot long one inch OD tube (high pressure tubing) equipped controlled heaters and a hydrogen inlet. The catalyst was activated at 150° C. with hydrogen. A mixture of Polyol #2 (66.4%) and diisopropylamine (33.6%) was prepared for subsequent feed to the tubular reactor. Feed was initiated and the following conditions established: Pressure 1000 psi; feed rate 293g/hr; Temperature 210° C.; hydrogen flow 22 standard cc/min. A sample was collected after equilibration of the conditions. After removal of the excess amine by vacuum stripping, the product had the following analysis: Total amine 0.422 meg/g; conversion 86%; secondary amine content 58%; primary amine content 42%.

EXAMPLE 5

Preparation of a 6000 molecular weight N-(polyoxyalkyl)-N-(alkyl)amine using a secondary amine with a Catalyst #1. The procedure used was that of Example #1. Polyol #2 (800 g), diisopropylamine (385 g), and Catalyst #1 (28 g) were charged to a 2 liter reactor. The reactor was purged with hydrogen to remove air and pressurized to 400 psi with hydrogen. The system was heated to 190° C. and held at temperature for about 20.5 hours. Filtration of the catalyst and removal of the excess volatile materials gave a product with the following analysis: Total amine 0.457 meg/g; conversion 93%; secondary amine 82% and primary amine 18%, tertiary 0.021 meg/g.

EXAMPLE 6

Preparation of ca. 6000 MW N-(polyoxyalkyl)-N-(alkyl)amine. Polyol #2 (80%), isopropylamine (18%) and Catalyst #1 (2%) were charged to a high pressure commercial reactor. This system was pressurized and vented with hydrogen and then pressurized to about 350 psi with hydrogen. The reactor was heated to 180°-190° C. for 48 hours. After isolation as in Example

1, the amine terminated polyol had a conversion of 92% and contained about 27% secondary amine, 73% primary amine, and 0.0015 meg/g tertiary amine.

EXAMPLE 7

Preparation of about a 2000 molecular weight N-(polytetramethyleneglycol)-N-(alkyl)amine using a secondary amine with Catalyst #1. The procedure used was that of Example #2. Polyol #3 (515.9 g), diisopropylamine (523.8 g), and Catalyst #1 (23.3 g) were charged to a 2 liter reactor. The reactor was purged with hydrogen to remove air and pressurized to 200 psi with hydrogen. The system was heated to 190° C. and held at temperature for about 21.5 hours. Filtration to the catalyst and removal of the excess volatile materials gave a product with the following analysis: Total amine 0.768 meg/g; conversion 80%; secondary amine 94% and primary amine 6%.

EXAMPLE 8

Preparation of about a 400 molecular weight N-(polyoxyethyl)-N-(alkyl)amine using a secondary amine with a nickel catalyst. The procedure used was that of Example #1. Polyol #4 (538.0 g), diisopropylamine (1357.8 g), and Catalyst #1 (42.6 g) were charged to a 1 gallon reactor. The reactor was purged with hydrogen to remove air and pressurized to 200 psi with hydrogen. The system was heated to 190° C. and held at temperature for about 23.5 hours. Filtration of the catalyst and removal of the excess volatile materials gave a product with the following analysis: Total amine 3.78 meg/g; conversion 91%; secondary amine 92% and primary amine 8%.

COMPARATIVE POLYMER A

T-5000 (100 pbw) and DETDA (44 pbw) were premixed and then thoroughly degassed, this blend was then charged into the resin tank of a small scale RIM machine (as described in U.S. Pat. No. 4,189,070). ISONATE TM Code 205 isocyanate was degassed and then charged to the isocyanate tank. The resin component was adjusted to 55°-60° C. and the isocyanate component to 60°-75° C. The weight ratio was adjusted to 1.2/1.0 resin/isocyanate at a total throughput of 115 grams/second. The components were injected into a 8"x3"x0.125" aluminum mold which had been preheated to 120° C. The parts were demolded in about 1 minute. Acceptable parts were produced, however there was evidence of poor mixing prior to the aftermixer and stretch marks could be observed in the molding indicating that there was some premature gelation. Some parts were post cured for 1 hour at 190° C. while others were not postcured.

POLYMER #1

The experiment of Comparative Polymer A was repeated with the exception that the T-5000 was replaced with the N-(polyoxyalkyl)-N-(alkyl)amine from Example 1. The plaques from this formulation showed a higher degree of mixing (no striations) and improved flow characteristics in the mold as shown by the absence of any stretch marks.

After aging for about 7 days at 70° F. and 50% RH plaques from Comparative Polymer A and Polymer #1 were submitted for physical and dynamic property testing, the results are shown in Table 1.

TABLE 1

Physical Properties of Polyureas Based on N—(polyoxyalkyl)-N—(alkyl)amines and Conventional Amine Terminated Polyethers - A Comparison.

| Amine Material Polymer ID # | T-5000 Comparative Polymer A | | Example 1 Polymer #1 | | |
|---|---|---|---|---|---|
| Post Cure (Temp.) | None | 190° C. | None | 190° C. | ASTM Ref. |
| Time (Hours) | — | 1 | — | 1 | |
| Property | | | | | |
| Hardness (Shore D) | 65 | 64 | 65 | 66 | D-2240 |
| Tensile Strength (psi) | 4000 | 4400 | 4120 | 4100 | D-412 |
| Elongation (%) | 320 | 320 | 354 | 300 | D-412 |
| Die C Tear (pli) | 556 | 621 | 559 | 636 | D-624C |
| Sag, 1 Hr, 6" overhang | | | | | |
| 120° C., in | 0.25 | 0.14 | 0.24 | 0.05 | * |
| 175° C., in | 1.22 | 0.29 | 1.06 | 0.28 | * |
| Flex. Mod., Mpsi | | | | | |
| @ −29° C. | 113 | 102 | 115 | 90 | D-790 |
| @ +23° C. | 55 | 60 | 57 | 57 | |
| @ +70° C. | 44 | 47 | 47 | 44 | |
| −29C/+70° C. multiple | 2.6 | 2.1 | 2.5 | 2.0 | |

*General Motors Chevrolet Division Test Method CT222006AA

Dynamic Mechanical Data* (Post Cured Samples) Shear Modulus (G') in Mpsi

| Dynamic Mechanical Data* (Post Cured Samples) Shear Modulus (G') in Mpsi | | |
|---|---|---|
| | Comp. Polymer A | Polymer #1 |
| Temperature (°C.) | | |
| −29 | 125 | 130 |
| +23 | 64 | 78 |
| +70 | 53 | 62 |
| +202 | 38 | 46 |
| +240 | 23 | 36 |
| Multiple | | |
| −20/+70 | 2.4 | 2.1 |
| −20/+202 | 3.3 | 2.8 |
| −20/+240 | 5.4 | 3.6 |

*Rheovibron Mechanical Spectrometer, 2° C./minute

Dynamic mechanical properties of the polyureas were studied over the temperature range −120° to +240° C. Performance of Polymer #1 elastomer was outstanding. Both elastomer systems showed the expected low temperature transition (Tg) at −53° C. and neither system showed any significant higher temperature transition (Tm). However, Polymer #1 elastomer had a substantially better modulus multiple over the broad use temperature range. The implication is that Polymer #1 materials will give better performance in applications requiring high temperature capability (i.e. automotive body panels in high temperature paint ovens). Note also that dynamic mechanical data indicate that Polymer #1 material carries its high temperature advantage to a temperature approaching 240° C. This is an extremely high temperature for this type of elastomer. Current commercial polyurethane/ureas and pure polyurethane cannot withstand such a temperature without substantial loss of modulus from degradation.

POLYMER #2

The procedure of Polymer #1 was repeated with the exception that N-(polyoxyalkyl)-N-(alkyl)amine from Example 2 was used to replace the N-(polyoxyalkyl)-N-(alkyl)amine from Example 1. A larger mold was used (10.75"x6.3"x0.125") to evaluate the processability of systems based on this N-(polyoxyalkyl)-N-(alkyl)amine.

[Note: Rapid gelation of the Comparative Polymer A prevented complete filling of this larger mold cavity. Parts only up to 10" long were produced in the large mold. Further increase in shot size did not increase the flow length to allow complete filling of the 10.75" length in the mold, and considerable stretching of the rapidly gelling material could be observed.]

In comparison the full 10.75" length of the mold cavity could be easily filled with Polymer #2. There were no apparent stretch marks and complete plaques were produced.

POLYMER #3

The experiment of Comparative Polymer A was repeated with the exception that T-5000 was replaced with the N-(polyoxyalkyl)-N-(alkyl)amine from Example 2 and the materials were used as supplied, i.e. no degassing was carried out prior to processing. After physical testing, the results are shown in Table 2.

COMPARATIVE POLYMER B

The experiment of Comparative Polymer A was repeated with the exception that the materials were used as supplied i.e. no degassing was carried out prior to processing. After aging for about 7 days at 70° F. and 50% RH plaques were submitted for physical testing, the results are shown in Table 2.

POLYMER #4

The experiment of Comparative Polymer A was repeated with the exception that the DETDA chain extender was replaced with t-BTDA and the materials were used as supplied i.e. no degassing was carried out prior to processing. This system proved extremely difficult to process. It proved impossible to mold a complete part, flow in the mold was very poor (limited to 3-4") and good mixing difficult to obtain. The poor quality of the parts produced probably accounting for the low physical properties obtained. This system proved much more difficult to process than Comparative Polymer A.

POLYMER #5

The experiment of Comparative Polymer A was repeated with the exception that T-5000 was replaced with the N-(polyoxyalky)-N-(alkyl)amine of Example 3 and the DETDA chain extender was replaced with t-BTDA. The system was easy to process and the large mold could be easily filled. No mixing problems or stretch lines were observed in the plaques. After aging for about 7 days at 70° F and 50% RH plaques were submitted for physical testing, the results are shown in Table 2.

POLYMER #6

An isocyanate prepolymer was prepared by slowly dripping 163 g of Example 5 over a two hour period into 100 g of well agitated Isonate 143L at room temperature. The product contained no gelled material and was relatively low viscosity and had 9.20% free isocyanate.

POLYMER #7

An isocyanate prepolymer was prepared as in Polymer #6 except that 165 g of Example 4 was used. The prepolymer was very viscous (17,700 cps) and had 9.57% free isocyanate.

COMPARATIVE POLYMER C

An isocyanate prepolymer was prepared as in Polymer #6 except that 163.5 g of Example #6 was used. Addition of the ATP was not complete when the entire mass gelled to give an intractable product.

POLYMER #8

Curing 100 g of the Polymer #6 with 9.36 g of 1,4-butanediol gave an elastomer which was tough and resilient.

TABLE 2

Physical Properties of Polyureas Based on N—(polyoxyalkyl)-N—(alkyl)amine/Conventional Amine Terminated Polyether and Various Chain Extenders

| Polymer ID# | Polymer B | Polymer 3 | Polymer 4 | Polymer 4 | Polymer 5 | Polymer 5 | ASTM Ref. |
|---|---|---|---|---|---|---|---|
| Post Cure, 1 Hr @ 375° F. | yes | yes | none | yes | none | yes | |
| 3/5 - LM-15 | | | | | | | |
| Property | | | | | | | |
| Hardness (Shore D) | 60 | 64 | 60 | 63 | 65 | 65 | D-2240 |
| Tensile Strength (psi) | 2894 | 3000 | 2178 | — | 3019 | 2489 | D-412 |
| Elongation (%) | 291 | 281 | 157 | — | 409 | 262 | D-412 |
| Sag, 1 hr, 6" overhang | | | | | | | |
| 175° C., in | 0.35 | 0.2 | 3.86 | 0.44 | 4.3 | 3.86 | * |
| Flex. Mod., Mpsi | | | | | | | |
| @ −29° C. | 70.3 | 109.6 | 132.2 | 57.7 | 120.0 | 71.8 | D-790 |
| @ +23° C. | 48.7 | 68.1 | 59.5 | 47.1 | 59.6 | 51.2 | |
| @ +70° C. | 39.4 | 46.2 | 35.2 | 38.9 | 36.8 | 39.7 | |
| −29° C./+70° C. multiple | 1.78 | 2.4 | 3.75 | 1.48 | 3.26 | 1.81 | |

TABLE 2-continued

Physical Properties of Polyureas Based on
N—(polyoxyalkyl)-N—(alkyl)amine/Conventional Amine Terminated Polyether
and Various Chain Extenders

| Polymer ID# | Polymer B | Polymer 3 | Polymer 4 | Polymer 4 | Polymer 5 | Polymer 5 | ASTM Ref. |
|---|---|---|---|---|---|---|---|
| Processability | Poor Mixing Gelation | Very Good Mixing and Flow | Poor Mixing Gelation | Same | Very Good Mixing and Flow | Same | |

*General Motors Chevrolet Division
Test Method CTZZZ006AA

We claim:

1. A process for the preparation of elastomers which process comprises: reacting a amine mixture with an isocyanate in the presence of a chain extender wherein the amine mixture is of the general formula:

$$R \begin{matrix} [H]_{(hz)} \\ \left[ \begin{matrix} (P)_p \\ (S)_s \\ (T)_t \end{matrix} \right]_{z-(hz)} \end{matrix}$$

wherein:
R represents an initiator radical based on a compound containing Zerewitinoff active hydrogen atoms;
H represents a hydroxy-containing group of the formula:

$$(CH_2CH_2-O)_a(CH_2-\underset{\underset{CH_3}{|}}{CH}-O)_b(CH_2\underset{\underset{R'}{|}}{CH}-O)_c-(CH_2)_n\underset{\underset{R''}{|}}{CH}-OH;$$

P represents a primary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-(CH_2)_n\underset{\underset{R''}{|}}{CH}-NH_2;$$

S represents a secondary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$
$$-(CH_2)_n\underset{\underset{R''}{|}}{CH}-NH-R''';$$

T represents a tertiary amine-containing group of the formula:

$$(CH_2CH_2-O)_a(CH_2-\underset{\underset{CH_3}{|}}{CH}-O)_b(CH_2\underset{\underset{R'}{|}}{CH}-O)_c-$$
$$-(CH_2)_n\underset{\underset{R''}{|}}{CH}-NR'''R'''';$$

a is 0 to 175;
b is 0 to 175;
c is 0 to 30;
n is 1 to 3; the sum a+b+c must be greater than or equal to 2 when, n equals 1;
R' is an alkyl group containing from two carbon atom to eighteen carbon atoms;
R'' is hydrogen or an alkyl group containing up to eighteen carbon atoms;
R''' and R'''' are independently alkyl groups containing from two to twelve carbon atoms;
h is from 0 to 0.7;
p is from 0 to 0.5;
s is from 0.5 to 1.0;
t is from 0 to 0.15;
(hz) is the product of h and z;
p+s+t=1; and
z is 2 to 6, with the proviso that when z is 2 and a is zero, then b must be greater than 22.

2. The process of claim 1 wherein:
R contains from two to six carbon atoms,
a is 0 to 150,
b is 20 to 115,
c is 0 to 15,
R' is an alkyl group containing two carbon atoms, and,
R''' contains from two to six carbon atoms.

3. The process of claim 2 wherein:
R contains from three to six carbon atoms,
a is 0 to 90,
b is 25 to 98,
c is 0 to 2,
R''' is an isopropyl group, and
z is 3 to 6.

4. The process of claim 1 wherein R has a molecular weight of 18 to 400.

5. The process of claim 1 wherein R contains from three to six carbon atoms.

6. The process of claim 5 wherein R is $$\begin{matrix} CH_2-CH-CH_2. \\ | \quad | \quad | \\ O \quad O \quad O \\ | \quad | \quad | \end{matrix}$$

7. The process of claim 1 wherein the amine has an equivalent weight of 1,000 to 10,000.

8. The elastomer produced in accordance with the process of claim 1.

9. The elastomer produced in accordance with the process of claim 2.

10. The elastomer produced in accordance with the process of claim 3.

11. The elastomer produced in accordance with the process of claim 4.

12. The elastomer produced in accordance with the process of claim 5.

13. The elastomer produced in accordance with the process of claim 6.

14. The elastomer produced in accordance with the process of claim 7.

15. A process for the preparation of polyurea elastomers of polyurethane-urea elastomers which process comprises: reacting a amine mixture with an isocyanate in the presence of a chain extender wherein the amine mixture is of the general formula:

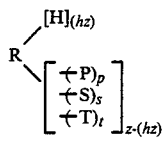

wherein:
R represents an initiator radical based on a compound containing Zerewitinoff active hydrogen atoms;
H represents a hydroxy-containing group of the formula:

P represents a primary amino-containing group of the formula:

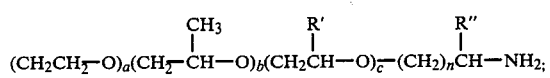

S represents a secondary amine-containing group of the formula:

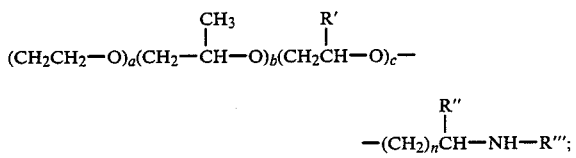

T represents a tertiary amine-containing group of the formula:

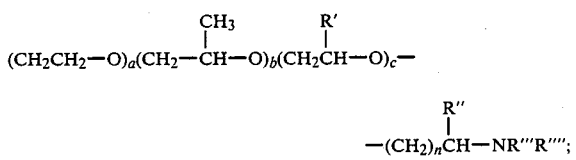

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R" is hydrogen or an alkyl group containing up to eighteen carbon atoms;
R''' and R'''' independently alkyl groups containing from two to twelve carbon atoms;
h is from 0 to 0.3;
p is from 0 to 0.4;
s is from 0.7 to 1.0;
t is from 0 to 0.05;
(hz) is the product of h and z;
p+s+t=1;
z is 3 to 6; and
where the equivalent weight of the amine is from about 1,000 to 10,000.

16. The process of claim 15 wherein:
a is 0 to 150,
b is 20 to 115,
c is 0 to 15,
R' is an alkyl group containing two carbon atoms, and
R''' contains from two to six carbon atoms.

17. The process of claim 15 wherein:
R contains from three to six carbon atoms,
a is 0 to 90,
b is 25 to 98,
c is 0 to 2, and
R''' is an isopropyl group.

18. The process of claim 16 wherein R has a molecular weight of 18 to 400.

19. The process of claim 15 wherein R is

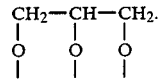

20. The elastomer produced in accordance with the process of claim 15.

21. The elastomer produced in accordance with the process of claim 16.

22. The elastomer produced in accordance with the process of claim 17.

23. The elastomer produced in accordance with the process of claim 18.

24. The elastomer produced in accordance with the process of claim 19.

25. A cast elastomer produced in accordance with the process of claim 1.

26. A reaction injection molding elastomer produced in accordance with the process of claim 1.

* * * * *